United States Patent [19]

Nicholas

[11] Patent Number: 4,522,722

[45] Date of Patent: Jun. 11, 1985

[54] NITROGEN AND PHOSPHORUS REMOVAL FROM WASTEWATER

[75] Inventor: David M. Nicholas, New Tripoli, Pa.

[73] Assignee: Air Products and Chemicals, Inc., Allentown, Pa.

[21] Appl. No.: 472,451

[22] Filed: Mar. 7, 1983

[51] Int. Cl.³ .............................................. C02F 3/30
[52] U.S. Cl. .................................. 210/605; 210/624; 210/630
[58] Field of Search ............... 210/605, 622, 621, 624, 210/629, 630, 625, 903, 906

[56] References Cited

U.S. PATENT DOCUMENTS 3,994,802  11/1976  Casey et al. .......................... 210/605

Primary Examiner—Thomas Wyse
Attorney, Agent, or Firm—Thomas G. Ryder; James C. Simmons; E. Eugene Innis

[57] ABSTRACT

Wastewater is passed sequentially through an anaerobic treating zone and an oxic treating zone, followed by separation from the treated liquor of a dense sludge containing activated biomass, a least part of which is recycled to provide the activated biomass employed in treating the influent wastewater. Of the part of the sludge so recycled a minor portion is introduced into the anaerobic treating zone for admixture with the wastewater influent and the remaining major portion is introduced into the oxic treating zone, into which oxic zone oxygen-containing gas is admitted to effect oxygenation of the contents of that zone.

4 Claims, 1 Drawing Figure

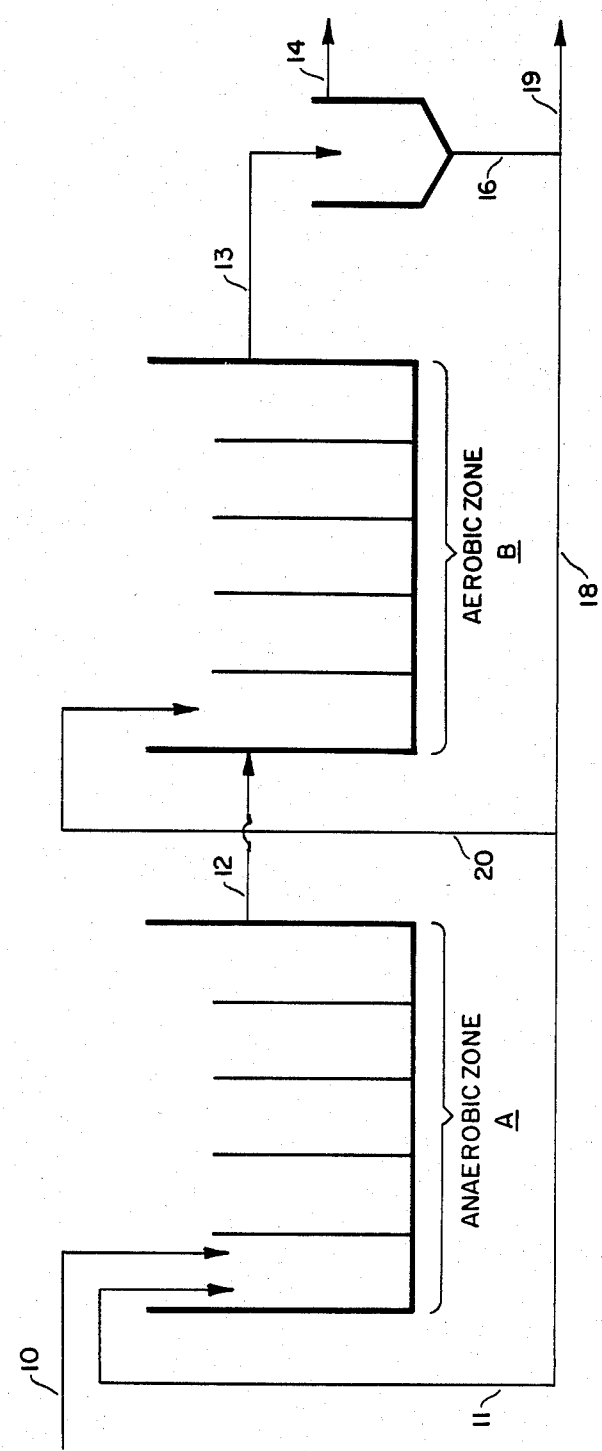

NITROGEN AND PHOSPHORUS REMOVAL FROM WASTEWATER

TECHNICAL FIELD

The present invention relates to systems and processes for the treatment of wastewater by active biomass contained in recycled sludge, to effect removal of nitrogen and phosphate values in addition to removal of contained BOD.

BACKGROUND OF THE PRIOR ART

The activated sludge process has been used for many years for the removal of biochemical oxygen demand, BOD, from the wastewater. This process consists of maintaining an aeration basin in which wastewater is fed to a suspension of microorganisms to form a mixed liquor. The mixed liquor is aerated to furnish oxygen for the respiration of the biomass, which sorbs, assimilates, and metabolizes the biological oxygen demand of the wastewater.

After a suitable period of aeration, the mixed liquor is introduced to a clarifier in which the biomass settles and the treated wastewater overflows into the receiving stream. A major portion of the settled biomass, which is concentrated at the bottom of the clarifier, is recycled to the aeration basin and a minor portion is purged in order to maintain a constant biosolids inventory within the system. This process has been extensively described in patents and technical publications. While the earlier commercial activated sludge plants employ atmospheric air to furnish the oxygen required to sustain the metabolic function of the microorganisms developed in the activated sludge, more recent commercial installations employ in one or more of the oxidation stages an aeration gas having a higher oxygen content than the 21% contained in atmospheric air.

While effective removal of the organic matter (BOD) present in wastewater has been achieved by the conventional activated sludge processes, there remained problems due to the retained presence of nitrogen and phosphorus values in the "purified" waters from such conventional processes, resulting in eutrophication of the waters to which they were returned. Various methods were devised for the removal of phosphorus and/or nitrogen components before return of the treated waters to holding reservoirs or natural bodies of water. Some of these methods are described by Shindala, A., in Water and Sewage Works, June 1972 at pages 66 to 71 and July 1972 at pages 60-67.

In U.S. Pat. No. 4,056,465 a modified activated sludge system is disclosed wherein BOD-containing wastewater and recycled sludge are initially admixed under anaerobic conditions in the substantial absence of oxygen or oxidizing agents and subsequently subjected to aeration and clarification. By the therein disclosed operation effective removal of phosphates is stated to be obtained while favoring the selective production of non-bulking biomass. In an alternative modification described in the patent, nitrates and nitrates (designated $NO_x-$) are also removed by interposing an anoxic treating zone between the anaerobic zone and the aerating zone. The patent advocates that the initial admixture of the recycled biomass (sludge) with the wastewater influent be under anaerobic conditions such that the basin or zone in which the mixed liquor is first formed is substantially free of $NO_x-$ and contains less than 0.7 ppm dissolved oxygen (DO); and that during the aeration or oxygenation for removal of BOD from the mixed liquor there be maintained a dissolved oxygen content of at least 1 ppm. In the modification described for removal of $NO_x-$ as well as phosphates, the interposed anoxic treating zone has a DO content not in excess of 0.7 ppm and $NO_x-$ is admitted to that zone, obtained by internal transfer of mixed liquor thereto from the oxygenated zone, to provide a $NO_x-$ concentration in excess of 2 ppm (expressed as elemental nitrogen). Under these conditions in the anoxic zone the $NO_x-$ is reduced to elemental nitrogen gas and discharged.

Systems such as those described in U.S. Pat. No. 4,056,465 employing an anaerobic zone for initial admixture of influent wastewater with recycled biomass have become to be known as "A/O" systems. The modified systems having an anoxic zone interposed between the anaerobic and the oxic treating zones are referred to as "A/A/O" systems or "$A^2/O$" systems.

Further improvements in systems of the A/O and $A^2/O$ type are set out in U.S. Pat. No. 4,271,026. According to that patent enhanced removal of phosphorus is obtained by maintaining operating conditions within the processing system encompassing the initial anaerobic treatment and extending through the process up to, but not including, the separation step, a BOD to phosphorus (BOD/P) ratio from about 5:1 and up to about 50:1, wherein BOD is expressed as milligrams of soluble BOD (exclusive of that attributable to ammonia) per liter of influent, and P is soluble phosphate expressed in milligrams of elemental phosphorus per liter of influent. Also the system is to be operated at a food to biomass (F/M) ratio from about 0.09 to an upper limit of about 1.4, wherein F is the total weight of soluble BOD introduced into the process per 24 hour day, and M is the weight of volatile suspended solids in the process system.

In an article by Davelaar et al, titled "The Significance of an Anaerobic Zone for the Biological Removal of Phosphate from Wastewaters", (Water, S. A. vol. 4, No. 2, April 1978, pages 54 to 60), the authors describe certain of the theories advanced with respect to the function of the anaerobic zone, particularly with respect to phosphate removal, and the adverse effect on phosphate removal of the presence of nitrate in the inflow to the anaerobic zone. The article compares experimental results obtained in the laboratory scale operation of two activated sludge units, designated A and B. In the B unit the sewage influent and recycled sludge were admixed in an anoxic zone and flowed therefrom to an aerobic zone, followed by solids separation to recycle the settled activated sludge fraction to the anoxic zone. In the A unit an anaerobic zone was interposed between the anoxic and aerobic zones. Unit A with the interposed anaerobic stage, was found to have superior phosphate removal ability.

The methods currently being employed to effect desired nitrification in systems operating in the A/O mode or in the $A^2/O$ mode, necessitate a change in the operating conditions otherwise advocated for the anaerobic as well as for the aerobic treatment of the mixed liquor. While the attempted modifications in such operating conditions may be found advantageous for enhancing nitrification, they often may be detrimental to maintaining desired sludge properties or to the desired extent of phosphorus removal. Among methods proposed or used for enhancing nitrification in A/O and $A^2/O$ systems, is that of increasing the solids concentration in the aerobic basin by increasing the amount of sludge recycled. Such method has the drawback of thus reducing the food to biomass ratio (F/M) in the anaerobic zone, with possible subsequent detrimental effects on sludge properties and phosphorus removal.

Another method for inducing an A/O or $A^2/O$ system to nitrify, is to increase the aerobic influent detention time (IDT). This can be accomplished by providing an increased volume for the aerobic zone. Such volume increase, however, would change the ratio of the IDT in the anaerobic zone to the IDT in the aerobic zone. Decreasing flow of influent to the A/O or $A^2/O$ system would provide an increase in aerobic IDT, but at the same time would increase the anaerobic IDT, and accordingly would decrease the F/M ratio in the anaerobic zone.

One of the objects of the present invention is to maximize removal of phosphorus in a system operating in the A/O or $A^2/O$ mode accompanied by desired nitrification, without adversely effecting phosphorus removal or impairing desired sludge properties.

SUMMARY OF THE INVENTION

The above-indicated desired objectives are attained, in accordance with the invention, by splitting the recycled sludge stream in an activated sludge wastewater treating system, so that a smaller portion of the recycled sludge is introduced into an anaerobic zone for initial admixture with wastewater influent, while the larger portion thereof is fed to the aerobic zone wherein the mixed liquor from the anaerobic zone is subjected to aeration or oxygenation. By splitting of the sludge recycle in this manner, more solids are made available at high sludge age in the aerobic zone where they are effective in enhancing desired nitrification, while less solids are introduced into the anaerobic zone as a result of which the high F/M ratios in the anaerobic zone are such as to promote good sludge properties and enhance phosphorus removal.

BRIEF DESCRIPTION OF THE DRAWINGS

The single FIGURE of the accompanying drawing is a diagrammatic representation of a flow scheme in accordance with the invention.

DETAILED DESCRIPTION

As is illustrated in the drawing, the principal elements of the system are comprised of an anaerobic zone designated A, an aerobic zone designated B and a settler or clarifier C. The wastewater influent to be treated is introduced by line 10 into the anaerobic zone A, where it is admixed with a portion of the recycled sludge returned to zone A by line 11. As is known in the art, zone A is generally partitioned or otherwise divided into a plurality of hydraulically separate treating sections. While five such sections are illustrated in the drawing, it will be understood that there may be a larger or smaller number of such sections. To effect thorough contact between the recycled sludge and the influent wastewater all or at least some of the sections of the anaerobic zone A are provided with stirring means (not shown). To maintain anaerobic conditions in zone A, that zone may be provided with a cover, and/or inert gas such as nitrogen may be bubbled into the zone to inhibit access of air. The various means for maintaining desired liquid stages and anaerobic conditions in zone A are more fully explained in U.S. Pat. No. 4,056,465 and are incorporated herein by reference thereto.

Leaving the last section of anaerobic zone A the mixed liquor is transferred by line 12 to the aerobic or oxic zone B in which it is subjected to treatment with an oxygen-containing gas, which may be air or a gas of higher oxygen content. As in the case of zone A, zone B is also preferably divided into a number of flow interconnected treating sections, which may be more or less than the five sections illustrated in the drawing. Zones A and B may be separate vessels in flow communication or may be physically partitioned zones in a single basin, provided that means are provided to maintaining unidirectional flow (A to B) therebetween without backmixing.

Aeration or oxygenation of the mixed liquor in zone B may be accomplished by any of the known methods of the prior art. Thus, compressed air, for example, may be introduced by spargers, diffusers or the like; or, if desired, instead of, or in addition thereto, mechanical surface aerators may be employed. If gas of higher $O_2$ concentration than that in air is to be employed in zone B, all or part of that zone may be provided with a suitable cover.

Leaving the final sections of the oxic zone B, the mixed liquor is passed via conduit 13 to the clarifier or settling basin C, where it is separated into a settled denser sludge portion and a supernatant liquid removed at or near the liquid level by line 14. The dense sludge is discharged at the bottom of C by line 16, a portion of which is recycled via line 18 and the remainder discharged through line 19.

The system thus far described is largely structually similar to that heretofore described and illustrated by the disclosed embodiment in FIG. 1 of U.S. Pat. No. 4,056,465. While in the earlier disclosed embodiment of that patent the entire recycled portion of the sludge separated from the oxidized mixed liquor is introduced into the anaerobic zone for admixture with wastewater influent, this practice is not followed in operation according to the present invention.

In the system operated in accordance with the invention the recycled sludge in line 18 is split into a major portion withdrawn from line 18 by line 20 and a remaining minor portion sent to zone A via line 11. The major portion of the recycle sludge from line 18 is introduced by line 20 into zone B. In general, the portion of recycled sludge sent to the anaerobic zone (A) may constitute 5 to 30% of influent flow, while the portion of the recycled sludge introduced by line 20 into the oxic zone (B) may constitute 10 to 60% of influent flow.

While the operation of the invention has thus far been described in connection with a system of the A/O type, it may also be utilized in connection with a system of the $A^2/O$ type, in which an anoxic zone is interposed between the anaerobic zone and the oxic zone, as illustrated for example by the embodiment of FIG. 2 of U.S. Pat. No. 4,056,465. In such event, 5 to 30% of the recycled sludge will be introduced into the anaerobic zone, 0 to 30% into the anoxic zone, and 10% to 60% discharged into the oxic zone. Whether applied to an activated sludge wastewater system operating in the A/O mode or one operating in the $A^2/O$ mode, the splitting of the recycled sludge in the manner described provides more solids where needed to enhance nitrification and a reduced amount of solids in the anaerobic zone which is beneficial for promoting phosphorus removal and obtaining good sludge properties as a result of the high F/M ratio thus obtained.

The following examples illustrate results obtained in laboratory runs made following the invention. The wastewater feed in these runs was obtained from primary clarifier effluent of wastewater at the Blue Plains Wastewater Treating Plant in Washington, D.C. The reactors had three equal stages constituting the anaerobic zone and five equal stages constituting the oxic zone; from the last stage of which the oxidized mixed liquor was separated to provide a sludge portion for recycling. In each run the total influent detention time (IDT) was approximately 1.6 hours, of which 0.531 hours were had in the anaerobic zone and 1.062 hours in the oxic zone. A sludge recycle rate of approximately 40% of the influent was used, of which 12% was sent to the anaerobic zone and 27% sent to the oxic zone.

Tables 1 and 2 report the averaged data on the runs made in consecutive 7 day periods.

TABLE 1

| Parameter | 1st Period | 2nd Period |
|---|---|---|
| IDT (hr) | 1.59 | 1.61 |
| Sludge recycled to the anaerobic zone (% influent flow) | 12.1 | 12.5 |
| Sludge recycled to the oxic zone (% influent flow) | 27.0 | 27.1 |
| Anaerobic MLTSS (mg/L) | 2,267 | 2,523 |
| Aerobic MLTSS (mg/L) | 6,702 | 7,268 |
| Anaerobic MLVSS (mg/L) | 1,554 | 1,712 |
| Aerobic MLVSS (mg/L) | 4,464 | 4,877 |
| SVI (ml/g TSS) | 85 | 84 |
| Anaerobic DO (mg/L) | 0.35 | 0.20 |
| Aerobic DO (mg/L) | 4.10 | 4.20 |
| Average temperature (°F.) | 21.6 | 22.4 |
| Sludge recycle VSS (mg/L) | 12,485 | 14,551 |
| Zone settling velocity (ft/hr) | 4.34 | 2.50 |
| F/M, Stage 1 | | |
| g $BOD_U$/g VSS/day | 3.24 | 1.99 |
| g $BOD_F$/g VSS/day | 3.23 | 3.06 |
| F/M, Oxic | | |
| g $BOD_U$/g VSS/day | 0.185 | 0.171 |
| g $BOD_F$/g VSS/day | 0.155 | 0.156 |

SVI = Sludge Volume Index
U = Unfiltered
F = Filtered

TABLE 2*

| | First Week | | Second Week | |
|---|---|---|---|---|
| Parameter | Influent | Effluent | Influent | Effluent |
| TSS | 37.5 | 10.0 | 30.6 | 12.0 |
| $COD_U$ | 127.5 | 38.7 | 125.4 | 40.3 |
| $COD_F$ | 86.1 | 28.9 | 93.3 | 20.2 |
| $BOD_U$ | 41.4 | 2.7 | 39.4 | 2.0 |
| $BOD_F$ | 17.4 | 1.6 | 36.6 | 1.4 |
| Ammonia Nitrogen as N | 8.7 | 2.4 | 8.4 | 2.7 |
| $NO_x$—nitrogen as N | 0.05 | 2.9 | 0.06 | 3.6 |
| Phosphates as P | 2.7 | 0.45 | 3.3 | 1.05 |

*All values expressed as Mg/L

Table 1 lists the weekly average operating parameters. Table 2 lists the weekly average concentrations of the influent and effluent in mg/L.

It will be seen from the data reported in these tables, that:

(1) Excellent sludge properties were obtained by splitting the recycled sludge in the manner indicated. SVI values were less than 85 ml/g TSS and a relatively concentrated sludge recycle was obtained, greater than 12.480 mg/L.

(2) Phosphorus removal capabilities were unaffected by the split recycle system. Effluent phosphorus concentrations were 0.5 to 1.0 mg/L for the two periods, while characteristic phosphorus release in the anaerobic zone and subsequent uptake in the oxic zone were observed.

(3) Ammonia values in the wastewater were reduced from an average of 8.7 and 8.4 mg/L to respectively 2.4 and 2.7 mg/L during the two week period.

(4) Excellent removal of BOD, COD and TSS were obtained, apparently unaffected by the split recycle system.

(5) Practice of splitting the sludge recycle, in accordance with the invention, maximizes phosphorus removal and nitrification in an A/O or $A^2$/O system without adverse effect on sludge properties. By putting the larger part of the recycled sludge into the aerobic zone, more solids are then made available to promote desired nitrification in that zone as a result of the higher aerobic sludge age. The correspondingly smaller amount of solids in the anaerobic zone enhances sludge properties and favors maximum phosphorus removal because of the resulting higher F/M ratio.

What is claimed:

1. The method of purifying wastewater by treatment with activated biomass which comprises passing the influent wastewater through a plurality of treating zones comprising at least an initial anaerobic treating zone and a last oxic treating zone; passing the effluent from said last oxic treating zone to a separation zone to cause settling therefrom of a dense sludge layer containing activated biomass; recycling at least part of said sludge layer to provide the activated biomass employed for treatment of the wastewater; splitting the recycled part of said recycled sludge into a major portion and a minor portion; introducing said minor portion into the initial anaerobic treating zone wherein it is admixed with wastewater influent, and introducing the major portion of said recycled sludge into an oxic treating zone, wherein the contents of said oxic zone are subjected to oxygenation by contact with oxygen-containing gas admitted to said zone.

2. The method of purifying wastewater as defined in claim 1 wherein said major portion of the recycled sludge constitutes 10 to 60% of influent flow and said minor portion constitutes 5 to 30% of influent flow.

3. The method of purifying wastewater as defined in claim 1 wherein an anoxic treating zone is interposed between the anaerobic treating zone and the oxic treating zone, a portion of the treated liquor from said oxic treating zone being recycled to said anoxic treating zone.

4. The method as defined in claim 3 wherein recycled sludge is introduced into the anoxic treating zone at a rate constituting 0 to 30% of influent flow.

* * * * *